United States Patent [19]

An

[11] 4,412,098

[45] Oct. 25, 1983

[54] AUDIO SIGNAL RECOGNITION COMPUTER

[75] Inventor: Byung H. An, Anaheim, Calif.

[73] Assignee: Interstate Electronics Corporation, Anaheim, Calif.

[21] Appl. No.: 249,296

[22] Filed: Mar. 30, 1981

Related U.S. Application Data

[62] Division of Ser. No. 73,792, Sep. 10, 1979, Pat. No. 4,292,470.

[51] Int. Cl.³ .............................................. G10L 1/00
[52] U.S. Cl. ..................................... 381/43; 364/513.5
[58] Field of Search ................. 179/1 SD, 1 SM, 1 J, 179/15.55 R, 15.55 T; 340/146.3 MA; 364/200 MS File, 900 MS File, 513

[56] References Cited

U.S. PATENT DOCUMENTS

| | | | |
|---|---|---|---|
| 3,236,947 | 2/1966 | Clapper | 179/1 SA |
| 3,302,185 | 1/1967 | Cox et al. | 340/172.5 |
| 3,333,248 | 7/1967 | Greenberg et al. | 340/172.5 |
| 3,351,917 | 11/1967 | Shimabukuro | 340/172.5 |
| 3,501,750 | 3/1970 | Webb | 340/172.5 |
| 3,501,750 | 3/1970 | Anderson | 340/347 DD |
| 3,536,837 | 10/1970 | Fenton | 179/1 |
| 3,553,651 | 1/1971 | Bird et al. | 340/172.5 |
| 3,582,559 | 6/1971 | Hitchcock | 179/15.55 R |
| 3,623,015 | 11/1971 | Schmitz et al. | 340/172.5 |
| 3,723,667 | 3/1973 | Park et al. | 179/100.1 |
| 3,739,085 | 6/1973 | Rosen et al. | 178/6 |
| 3,755,627 | 8/1973 | Berkowitz et al. | 179/1 SA |
| 3,812,291 | 5/1974 | Brodes et al. | 179/1 SA |
| 3,816,722 | 6/1974 | Sakoe et al. | 235/152 |
| 3,870,817 | 3/1975 | Kalfaian | 179/1 SA |
| 3,881,057 | 4/1975 | Adachi et al. | 179/1 J |
| 4,032,710 | 6/1977 | Martin et al. | 179/1 SA |
| 4,105,864 | 8/1978 | Berkovitz | 179/1 J |
| 4,109,310 | 8/1978 | England et al. | 364/200 |
| 4,121,058 | 10/1978 | Jusko et al. | 179/1 J |
| 4,227,177 | 10/1980 | Moshier | 340/146.3 R |
| 4,237,343 | 12/1980 | Kurtin | 179/1 J |

FOREIGN PATENT DOCUMENTS

2393471 12/1978 France .
2394206 1/1979 France .

OTHER PUBLICATIONS

"Results of a Prototype Television Bandwidth Compression Scheme", IEEE, vol. 55, No. 3, Mar., 1967, pp. 356-359.
"Dynamic Programming Algorithm Optimization for Spoken Word Recognition", vol. ASSP.26, No. 1, Feb. 1978, IEEE pp. 43-49.
"Connected Speech Recognition System DP-100", UDC 534.78:612.781.001.36, by Tsuruta, et al., pp. 88-93.
"Speech Recognition Experiments with Linear Predication, Bandpass Filtering, and Dynamic Programming", White et al. IEEE, vol. ASSP24, No. 2, Apr., 1976, pp. 183-188 & Title page.
"The Speech Chain: The Physics and Biology of Spoken Language", Bell Telephone Laboratories (Anchor Science Study Series).
"Trends in Speech Recognition", Prentice-Hall Signal Processing Series.
"Speech Analysis Synthesis and Perception", vol. 3, Academic Press, N.Y., 1965, pp. 273-275.
"Connected Word Recognition System", IBM Technical Disclosure Bulletin, 12/69, pp. 1123-1126.

*Primary Examiner*—Emanuel S. Kemeny
*Attorney, Agent, or Firm*—Knobbe, Martens, Olson & Bear

[57] ABSTRACT

A signal encoder and classifier particularly adapted to speech recognition includes a buffer which is independently addressed by a new data writing address system and a buffered data reading system so that writing and reading of data may be accomplished on a time shared basis. This time shared operation permits serial writing and reading of the pattern data without interrupting income signal storage. The reading data address system utilizes stored addresses identifying the beginning and end of the signal patterns for addressing sequential patterns from the buffer.

3 Claims, 4 Drawing Figures

AUDIO SIGNAL RECOGNITION COMPUTER

CROSS-REFERENCE TO RELATED APPLICATIONS

This application is a division of application Ser. No. 73,792, filed Sept. 10, 1979 and issued on Sept. 29, 1981 as U.S. Pat. No. 4,292,470.

BACKGROUND OF THE INVENTION

The present invention relates generally to a signal encoder and classifier, and more specifically to such an encoder and classifier for signal data obtained from a multiplicity of filters.

The assignee of this invention has developed certain systems for speech interpretation on which several patents have issued. The current invention involves several improvements and advances in regard to those patents. In addition, an additional application is currently pending which incorporates the technology disclosed in the prior patents, U.S. Pat. No. 3,812,291 and U.S. Pat. No. 3,582,559. These patents, as well as the pending application, Ser. No. 146,155, filed May 2, 1980, a continuation of Ser. No. 953,901, filed Oct. 23, 1978, and entitled Signal Pattern Encoder and Classifier, are incorporated herein by reference.

An automatic speech interpreter, as disclosed in the pending application, is essentially an acoustic pattern recognition device. Acoustically isolated utterances, such as words or phrases, are normalized by an information-theoretic compression technique that removes the effect of talker cadence and, to some degree, the effect of speaker variability. The resulting 120-bit pattern is then correlated with reference patterns derived through a training process. The only requirement for accurate recognition is reasonable acoustic separation between the patterns. The system can be retrained on line for new vocabularies, speakers, or acoustic environments.

Although the pending application describes an invention which has significant advances over the prior art in the areas of signal classification accuracy and economy in buffer storage space requirements, that application continues to experience a data buffering problem which is common to the field of art.

Upon recognition by the prior art devices that a complete word has been received, these devices discontinue reception of additional signal samples until the currently stored word is compressed, further encoded and tested. This halting of signal sampling results in a significant loss in signal continuity by the apparatus.

While the discontinuous sampling could theoretically be solved by serially buffering input data and later loading the buffered data, all in parallel, into a holding buffer, the volume of data normally required for speech and other signal pattern recognition is so large that such parallel data transfers become extremely costly. Furthermore, such data transfers are not common in microprogrammed implementations of such devices, and thus a viable solution to this problem has not been suggested in the prior art.

In addition, since the prior art typically shifts incoming data into a shift register, and then shifts this same data out of that register at the end of a word, the operations required for shifting the entire register contents must be accomplished for each word, regardless of the length of the word.

SUMMARY OF THE INVENTION

The present invention provides continuous acceptance of incoming data samples without a pause, while previously accepted samples are compressed and tested simultaneously, that is, on a time shared basis.

A buffer is used in the present invention to accept sequential signal pattern samples in serial form as the speech or other signal pattern is received. When a predetermined plurality of sequential samples fail to exceed the acceptable threshold, the system provides an indication that the signal pattern has ended.

The system automatically records the beginning buffer location and ending buffer location of each signal pattern. When a first pattern is completed, the buffer remains available for reception of further incoming data.

As soon as a complete signal pattern is present in the buffer, the system may begin to access the data samples of this data word, in serial, from the buffer, using the stored address for the beginning and end of the data word for locating the word and addressing its entire contents. This accessing is accomplished on a time shared basis with the data input, but is accomplished at a location in the buffer which is independent of the location being used for data input. Thus, for example, if a very long word is input into the buffer, followed by a series of shorter signal patterns, the accessing of the longer word for signal processing purposes may occur while several other signal patterns are being written into the buffer. The buffer is made long enough to store the data equivalent to twice the number of samples which would exist in the longest signal pattern to be monitored. In this manner, even this longest signal pattern can be completely read from the buffer after the beginning and end locations of the signal pattern are known, without interrupting incoming signal storage.

From this brief description, it will be seen that the delay which occurs between the inputting of data representing a given signal pattern and the reading of that same data is dependent not only upon the length of the data in that given signal pattern, but also upon the length of patterns previously stored in the buffer. The reading and writing operations are thus time independent of one another, although they occur on a time shared basis.

This independence is made possible by permitting, on a time shared basis, the data writing and data reading operations to independently address memory locations within the buffer.

The reading operation, addresses data in the buffer in response to the stored data indicating the beginning and end of stored samples. Thus, in order to retrieve a word, the reading addess system first addresses the initial data samples of that word as identified by the address which was stored when the word was written. The read addresser then sequentially addresses each of the following samples in the buffer until the last sample, as identified by the stored address, is retrieved. While, in the preferred embodiment, the sample rate into and out of the buffer is identical, it need not be.

It can be seen from this description that, for a very long signal pattern, the reading operation may take a significant period of time, during which time a plurality of new data patterns may be written into the memory. On the other hand, if a shorter signal pattern is read from the memory, the accessing time will be very short, and an entire new pattern may not be written.

During longer reading access times, plural data may be stored indicating the beginning and ending locations of plural successive samples at the input of the device for later processing. So long as no incoming signal pattern fills more than half of the buffer, no incoming data will be lost, although the advantages of serial writing and reading are maintained.

DESCRIPTION OF THE DRAWINGS

These and other advantages of the present invention are best understood by reference to the drawings in which.

DETAILED DESCRIPTION

Figure 1:
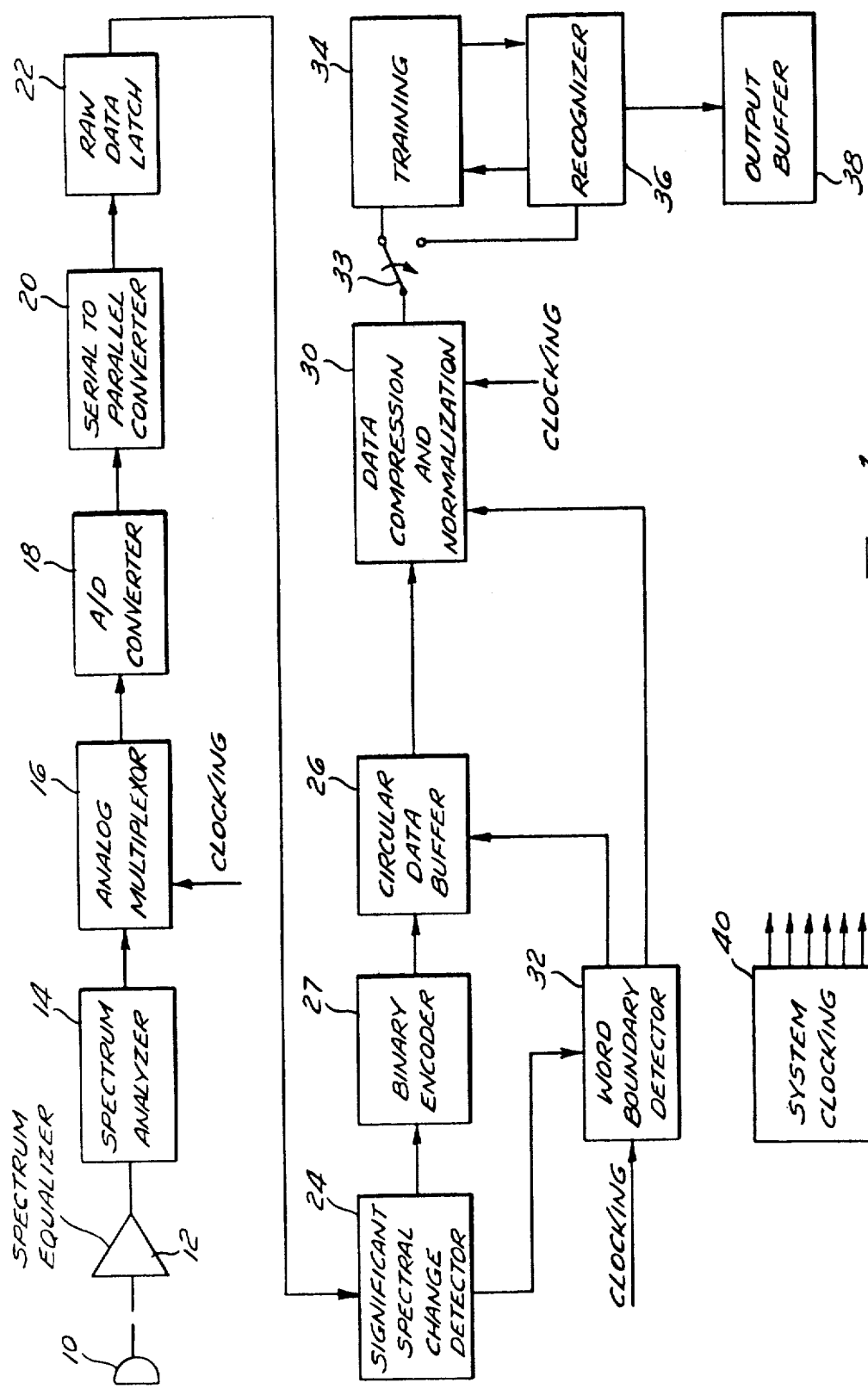
FIG. 1 is a block diagram of the signal pattern coder and classifier system.

Referring to FIG. 1, a block diagram of the signal pattern encoder and classifier is presented. Audio signals are presented to the device through a transducer 10, which may be any known component such as a microphone or telephone handset and may be remotely located from the rest of the apparatus as indicated in FIG. 1. A spectrum equalizer 12 amplifies and equalizes the spectrum signal received from transducer 10 prior to transmitting this signal to a spectrum analyzer 14.

The spectrum analyzer 14 filters the output of the spectrum equalizer 12 and divides this output into 16 separate and distinct frequency bands or channels. An analog multiplexor 16 receives these 16 separate frequency samples in response to a signal from a system clocking mechanism 40, serially feeds the 16 frequency samples into an analog to digital converter 18. The converter 18 changes each of the 16 analog frequency sample signals received from multiplexor 16 into separate, 8-bit digital signals representative of the analog signal received. These 16 digital signals are serially fed into a serial to parallel converter 20, which presents the signals in parallel form to a raw data latch 22.

A significant spectral change detector 24 receives data from the latch 22 and compares this incoming data with that of the most recently accepted previous spectral sample in a manner which was described in the currently pending application identified above. A binary encoder 27 receives the data accepted by the change detector 24 and encodes that data into a binary form. In addition, a word boundary detector 32 also receives signals from the change detector 24, indicating the receipt of data, and whether the data is accepted by the change detector 24. The word boundary detector 32 interprets a predetermined number of accepted signals as the beginning of an utterance, and a predetermined number of rejected signals as the end of an utterance. The boundary detector 32 is further connected to a circularly addressed data buffer 26 and a data compression and normalization circuit 30. The operation of the binary encoder 27, word boundary detector 32, and the data compression and normalization circuit 30 are described in the pending application identified above.

Figure 3:
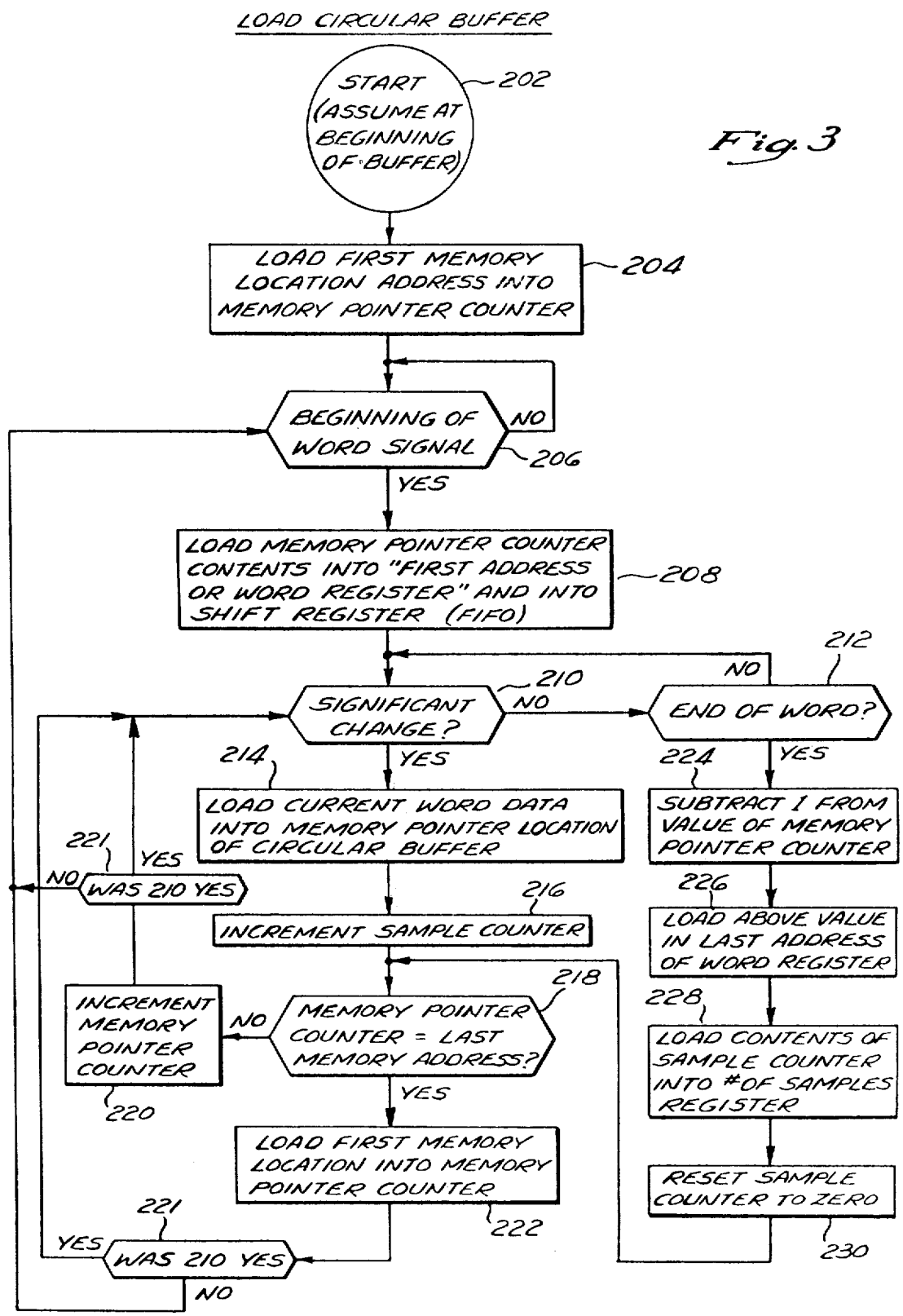
FIG. 3 is a flowchart depicting the operation of loading the circularly addressed buffer as it is performed by the circuitry of FIG. 2.

The circularly addressed data buffer 26 replaces the coded data buffer 45 of FIG. 3 of that pending application. This particular device provides a means whereby signal data may be continually received into the data buffer 26 at the same time that further compression and normalization of data earlier stored in data buffer 26 is accomplished by the data compression and normalization circuit 30. The operation of the data buffer 26 is described in more detail in a later portion of this section.

The data compression and normalization circuit 30 operates on a signal from the word boundary detector 32 and a signal from the system clocking device 40, taking data comprising a complete utterance or word from the circularly addressed data buffer 26 and further compressing it into an 120-bit binary coded word.

The system disclosed herein may provide the input for either a training circuit 34 or a recognizer circuit 36. A switch 33 determines which of the modes the system is operating in. The training circuit 34 provides a means of updating the reference patterns utilized in recognizing and classifying incoming audio signals, and is described in detail in a co-pending application filed by Richard David Beno, entitled TRAINING CIRCUIT FOR AUDIO SIGNAL RECOGNITION COMPUTER. The recognizer circuit 36 consists of devices for comparing those patterns representing newly accepted utterances to determine which of the patterns the new utterance most closely resembles.

An output buffer 38 retains the output signals from the recognizer 36, indicating the particular pattern which has been identified, and storing this data for use by associated devices.

The system clocking circuit 40 comprises a means for providing clocking signals used throughout the device by producing these signals in a manner which is commonly known and used by those skilled in the art.

Figure 2:
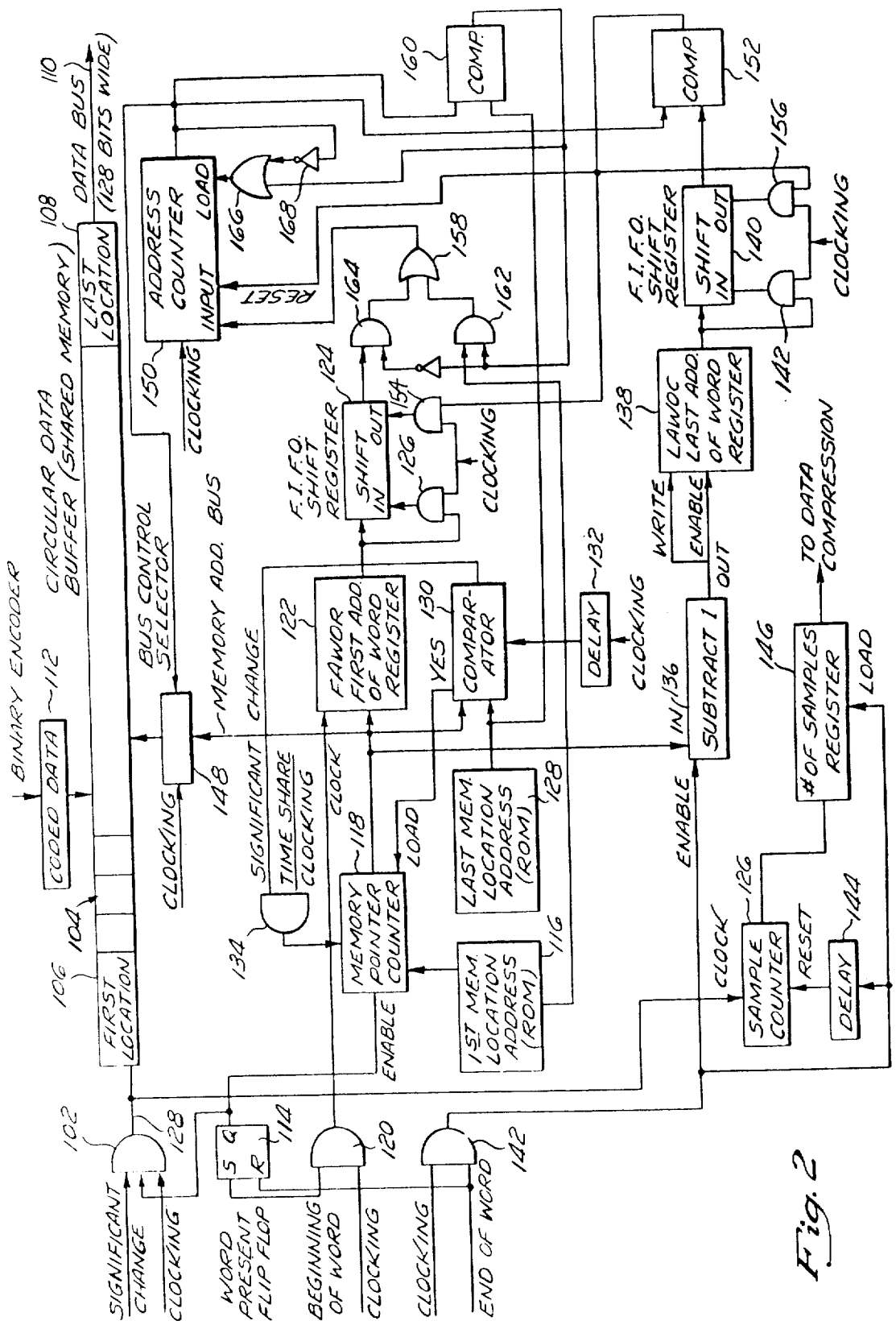
FIG. 2 is a schematic diagram of the circularly addressed data buffer and its associated control system.
Figure 4:
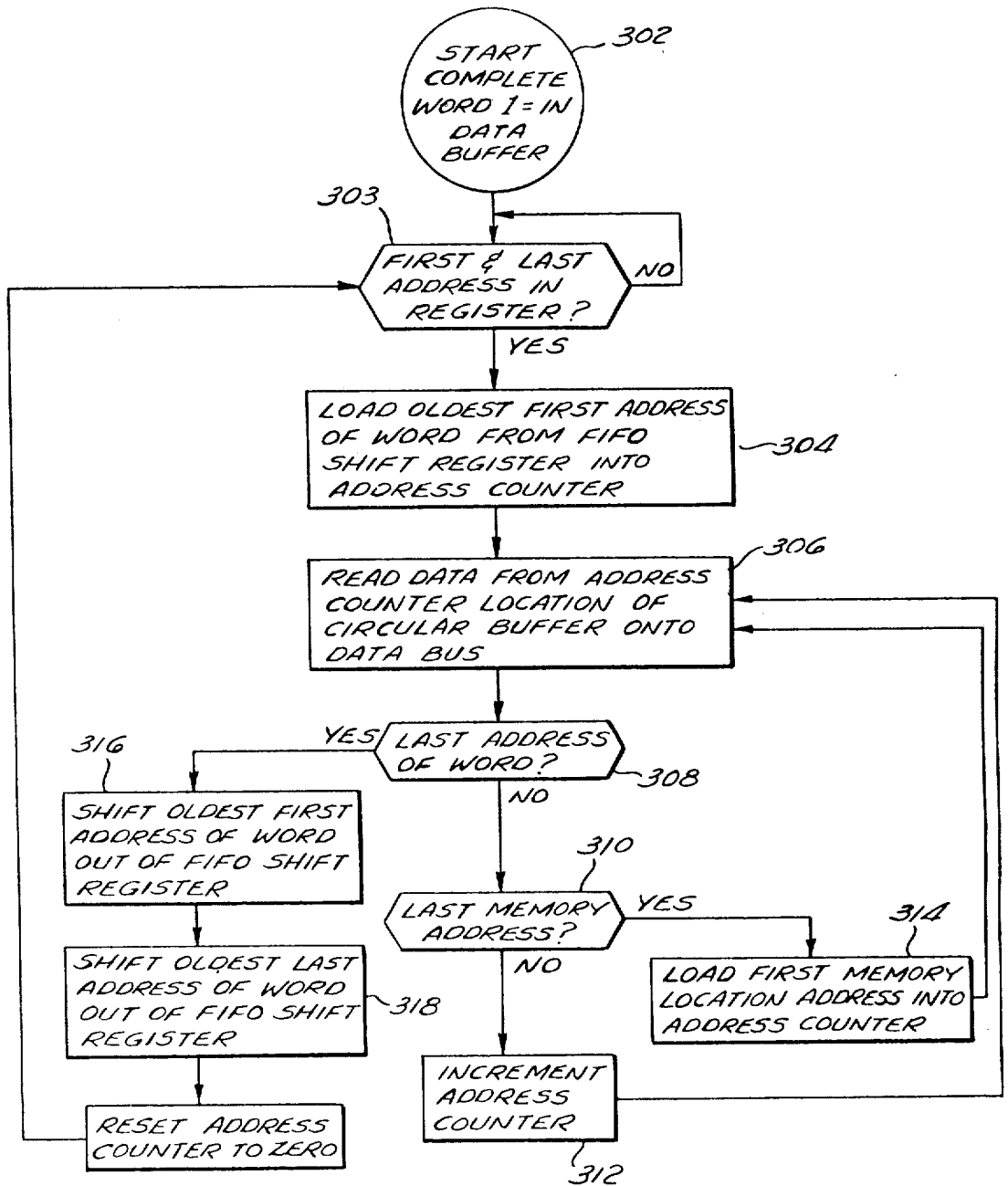
FIG. 4 is a flowchart depicting the operation of unloading the circularly addressed buffer as it is performed by the circuitry of FIG. 2.

A more detailed description of the operation of the circularly addressed data buffer 26 can be made by reference to the circuit diagram of FIG. 2 and the corresponding flowcharts of FIGS. 3 and 4.

The circularly addressed data buffer 26 includes a shared memory or data buffer 104. Data to be input into the data buffer 104 is received from the binary encoder 27 of FIG. 1 and is shown as coded data 112 in FIG. 2. Coded data 112 is sequentially clocked into the circular data buffer 104 beginning at a first location 106 and continuing until data is entered into a last location 108, at which time the device begins writing over the first location 106 again, in a circular fashion.

The clocking signal for loading data into the data buffer 104 is comprised of the output of an AND gate 102 which is controlled by a significant change signal from the significant spectral change detector 24 of FIG. 1, a beginning of word signal originating from the word boundary detector 32 of FIG. 1 and held high by a word present flip-flop 114 of FIG. 2, and a clocking signal from the system clocking device 40 of FIG. 1. The loading of the buffer 104 can be best described by reference to FIGS. 2 and 3.

In this discussion, it is assumed that the device is loading the data buffer 104 beginning at the first location 106 of FIG. 2, as indicated by block 202 of the flowchart of FIG. 3.

The address of the first location 106 is contained in a first memory location address ROM 116. Prior to reception of data from the binary encoder 27 of FIG. 1, the contents of the first memory location address ROM 116 are loaded into a memory pointer counter 118 of FIG. 2, as shown by block 204 of FIG. 3. Having accomplished this, the system waits for the reception of a Beginning- Of-Word signal from the word boundary detector 32 of FIG. 1, as shown in block 206 of FIG. 3.

Upon reception of the Beginning-Of-Word signal, the flip-flop 114 is immediately set, causing a Logical one signal to appear at its Q output and be input to the AND gate 102. This signal is also utilized as an enable input to the memory pointer counter 118 in order to allow that counter to function. A Beginning-Of-Word signal is also input to the AND gate 120, allowing the clocking pulse present there to pass through that gate 120 and appear on the clocking input of a First-Address-Of-Word (FAWDR) register 122, causing the data currently on the outputs of the memory pointer counter 118 to be loaded into the FAWDR register 122, as indicated in block 208 of FIG. 3. Upon loading of this data into the FAWDR register 122, it is immediately clocked into a First-In-First-Out (FIFO) shift register 124, and to an input of AND gate 126 having its output connected to the shift-in input of register 122 and its other input to a clocking signal, for causing a Shift-In function of the FIFO register 124 to load data from the register 122.

The system again waits until a signal from the significant spectral change detector 24 of FIG. 1 is received by the system, as indicated in block 210 of FIG. 3. In addition to testing for a significant change signal, the system also checks to see whether an End-Of-Word signal from word boundary detector 32 of FIG. 1 has been received, as indicated by block 212 of FIG. 3.

Upon sensing a significant change, the change detector 34 of FIG. 1 sends a Significant Change signal to the input of the AND gate 102 of FIG. 2 which, coupled with the presence of a Beginning-Of-Word signal from the flip-flop 114, allows a clocking signal to pass through the AND gate 102 and clock coded data 112 into the data buffer 104 in a location corresponding to that which has been present on the outputs of memory pointer counter 118. This action is reflected by block 214 of FIG. 3. The clocking signal from the AND gate 102 is also connected to the clocking input of a sample counter 126, causing that counter to increment as indicated by block 216 of FIG. 3.

Having loaded the current coded data into the data buffer 104, the system now checks to see whether the contents of the memory pointer counter 118 corresponds to the address of the data buffer's last location 108, which is contained in a last memory location address ROM 128.

This check is accomplished by comparing the contents of the last memory location address ROM 128 with the contents of the memory pointer counter 118 in comparator 130. This test is shown in block 218 of FIG. 3.

The output of the comparison made in the comparator 130 is not apparent until a clocking signal is received by the comparator 130. Since it is desirable that the coded data 112 be loaded into circular data buffer 104 at the location contained in memory pointer counter 118 prior to a change, delay mechanisms are added to the clocking to insure that the memory pointer counter 118 does not change prior to the completion of coded data 112 loading into the data buffer 104. After permitting enough time to elapse to accomplish the loading of data, delay mechanism 132 permits the clocking signal to clock the result of the comparison in the comparator 130 onto the system. If the memory pointer counter ROM 118 contents do not equal the last memory location address 128 contents, a No signal will appear on the output of comparator 130 which will also appear on the input to AND gate 134. In the presence of a significant change signal, the clocking signal, also present on the input of gate 134, is allowed to pass through, causing the memory pointer counter 118 to increment its value to the next sequential address location of data buffer 104. This action is indicated by block 220 of FIG. 3.

If comparator 130 indicates that the contents of the memory pointer counter 118 and the last memory location address ROM 128 are equal, a signal is generated causing the memory pointer counter 118 to load the contents of the first memory location address ROM 116, as indicated by block 222 of FIG. 3. This action effectively causes the data being input to data buffer 104 to continue from the last location 108 to the first location 106 in a circular manner.

Having accomplished the above steps, if there was a significant change at block 210, as checked at blocks 221, the system again waits, looking for the reception of an additional Significant Change signal, as indicated by block 210 of FIG. 3.

System operation continues in this manner until the word boundary detector 32 of FIG. 1 generates an End-Of-Word signal and communicates it to circular data buffer 26 of FIG. 1. Having tested for the End-Of-Word, as shown by the block 212 of FIG. 3, the system, upon receiving this signal, causes the output of the memory pointer counter 118 to be input to a subtractor 136, where one is subtracted from the value which was contained in the counter 118. Upon completion of this action, the output causes an Enable signal to activate the write mechanism of a Last-Address-Of-Word (LAWDC) register 138, permitting the value derived from the subtraction in block 136 to be placed in the LAWDC register 138. The act of subtracting in the subtracter 136 and storing the results in the LAWDC register 138 is depicted in blocks 224 and 226 of FIG. 3. Upon reception of new data in the LAWDC register 138, a signal is generated which is seen on one input of an AND gate 142, permitting a clocking signal to activate the shift in action of a register 140, shifting the most recent data from the register 138 into the First-In-First-Out (FIFO) shift register 140, which action is also depicted in block 228 of FIG. 3.

In addition to causing the above actions, the End-Of-Word signal which has appeared on the output of the AND gate 142 also appears on the Load input of a Number-Of-Samples register 146. This signal causes the contents of the sample counter 126 to be loaded into register 146. The signal appearing on the Load gate of the register 146 also appears on the Reset input of the sample counter 126, after passing through a delay mechanism 144. The delay mechanism 144 allows the loading of the counter 126 contents into the register 146 prior to the resetting operation which occurs upon the passage of the signal through delay mechanism 144. This action is indicated in block 230 of FIG. 3.

Having loaded the coded data of a complete word or utterance into the data buffer 104, the system returns to block 218 of FIG. 3, and accomplishes the steps described above in reference to blocks 218, 220, 221, and 222. Since no significant change was present at block 210, blocks 221 will return the system operation to a static state, where it waits for an additional Beginning Of Word signal from word boundary detector 32 of FIG. 1, as indicated by block 206 of FIG. 3.

The operation of unloading the circular buffer can best be described by reference to FIGS. 2 and 4. It is noted that, once a complete word is stored in the circular data buffer 104 of FIG. 2, the Read process will be started without affecting the continuing reading of further data into the data buffer 104. The reading and writing both utilize the same bus control selector 148 of FIG. 2. This device is shared without loss of incoming signals, since the device samples the incoming audio signals at a rate of approximately once every 5 milliseconds, but the time required to write a particular sample into the data buffer 104 is less than 2.5 milliseconds, and a corresponding read operation removing data from the data buffer 104 also requires less than 2.5 milliseconds. Therefore, the time sharing system, utilizing the same bus control selector 148 for both reading and writing, can be accomplished within a time period such that no pauses are necessary in sampling the incoming audio signals.

In order to start the read operation, a complete word must be stored in the data buffer 104 of FIG. 2, as is indicated in block 302 of FIG. 4. After shifting the First-Address-Of-Word data from the register 122 into the shift register 124, that data is shifted through the register 124 and is sequentially positioned behind any data which was previously placed in the register 124. Likewise, the data shifted from the register 138 into First-In-First-Out shift register 140 has been previously moved to a sequential position behind any previous data, and the positions of the data in the registers 124 and 140, which define the beginning and end of a corresponding word are adjacent, such that they will be shifted to the last position in the registers, arriving at that location at the same time.

Upon sensing that the outputs of the register 140 and a counter 150 are not equal, a comparator 152 produces a low signal, which appears on the inputs of AND gates 154 and 156, prohibiting the shifting out of data from the registers 124 and 140, and the signal also appears on the reset input of the address counter 150, allowing the output of an OR gate 158 to be loaded into the counter 150. When a comparator 160 senses that the contents of the address counter 150 and the ROM 128 are not equal, it produces a low signal, which appears on the input to an AND gate 162, with its inverted value appearing on the input of an AND gate 164. Since the comparator 160 has produced a low signal when its comparison values were not equal, its input to the AND gate 164 is high, allowing the contents of the shift register 124 to be transferred through the AND gate 164 and through the OR gate 158 and to be loaded into the address counter 150. This action is depicted in block 304 of FIG. 4.

Upon detecting an address location contained in the counter 150, the bus control selector 148 provides for the reading of data from a location in the data buffer 104, as specified by the contents of counter 150, onto the data bus 110, as is indicated by block 306 of FIG. 4. The flowchart of FIG. 4 indicates in block 308 that the next step of system operation is to test whether or not the data just retrieved was the last stored portion of the particular word being read. This comparison is accomplished by testing the contents of the counter 150 and the oldest address data in the register 140 in the comparator 152. If the comparison made in comparator 152 indicates that the tested quantities do not match, the device senses that it is not at the last address of the particular word being read, and the output of the comparator 152 is a logical zero which is unchanged from the output prior to the test.

If the device is not at the last address of the particular word being read, a test is then made to see whether the data just read was taken from the last location 108 of the data buffer 104, as indicated by block 310 of FIG. 4. This comparison is made by testing the contents of the address counter 150 with the contents of Last-Memory-Location-Address ROM 128 in the comparator 160. If the contents in the comparator 160 do not match, the output of that device continues to be low, causing no change to the system status.

Since the last data read from data buffer 104 was neither the last address of the word nor the last address of the data buffer 104, the address counter 150 is incremented by reception of a clocking signal, as is indicated in block 312 of FIG. 4.

If the comparator 160 had indicated a positive response to the comparison of the address counter 150 and the ROM 128, the output of the comparator 160 would be positive, producing a high signal through the OR gate 158, providing a load signal to the address counter 150. The Logical One output of the comparator 160 would also appear on the input of the AND gate 162, while the inversion of that signal by the inverter 168 would prevent the passage of data through the AND gate 164. Therefore, the contents of the First-Memory-Location Address ROM 116 would pass through the AND gate 162 and through the OR gate 158 to the input of the address counter 150, where it would be loaded into that counter. This action would cause the bus control selector 148 to receive an address from the address counter 150 which would correspond to the first location 106 of the data buffer 104, permitting the continued reading of data in a circular fashion, as previously discussed. The action of loading the first memory location into the address counter 150 is indicated in block 314 of FIG. 4.

The system response after loading in this first memory location, as well as at all times after incrementing the address counter 150, is to cause the contents of the address counter 150 to be transferred to the bus control selector 148, which in turn permits the data contained in the data buffer 148 corresponding to the address in the bus control selector 148 to be read out of that buffer onto the data bus 110, as is described in block 306 of FIG. 4.

The device continues to operate as previously described unless in the comparison of the address counter 150 and the shift register 140 in the comparator 152 shows that the contents of the counter 150 correspond to the last address of the word currently being read, as stored in the register 140. Upon this determination, the comparator 152 generates a Logical One output which is transmitted to the inputs of the AND gates 154 and 156, permitting clocking signals to be transferred through those gates to the Shift-Out inputs of the registers 124 and 140. This results in the shifting out of the registers 124 and 140 of the oldest address data for the First Word Address stored in register 124 and the Last Word Address of the word just read, as contained in register 140. This action is indicated in blocks 316 and 318 of FIG. 4. The output of comparator 152 also appears on the Reset input of the address counter 150, causing the contents of that counter 150 to be reset to a value of zero, as indicated in block 320 of FIG. 4.

If no additional data was behind that shifted out of the registers 124 and 140, the comparator 152 will continue to see equivalent contents of the empty counter 150 and the register 140, causing the address counter to be continuously reset until such time as additional data appears on the outputs of the register 140. At such time, the output of the comparator 152 will go low, removing the Reset signal from counter 150 and permitting a signal from the Zero Level output of the counter 150 which runs through the inverter 168 and the OR gate 166 to indicate a Load signal on the address counter 150. Upon reception of data in the register 124, the Load signal permits this data to be loaded into the counter 150, with the action of the device then continuing as has been previously described. The action of waiting for additional data in the registers 124 and 140 is described in block 303 of FIG. 4.

In light of the above discussion, it is apparent that the present device provides a significant improvement over the prior art systems in the area of reading and writing material into the data storage medium prior to compression of that data. The device provides a means of utilizing a typical computer memory 104 as a data buffer wherein both the reading and writing operations utilize a common bus control selector 148 to identify particular addresses in a common data buffer 104 for the handling of inputting and outputting data in a time independent manner. The time share method of utilizing the bus control selector 148 reduces the amount of circuitry and data storage required in gaining superior results to that of the prior art. The results are superior since the time share method provides for both reading and writing of the data into the single data buffer 104 within time limits such that no interruption of the data sampling process is necessary. This results in increased accuracy over the prior art since all data samples may be utilized in the recognition and training functions of the device as described.

Although a preferred embodiment of the invention has herein been disclosed, it is to be understood that the present disclosure is made by way of examples, and that variations are possible without departing from the subject matter coming within the scope of the following claims, which subject matter is regarded as the invention.

Having described the operation of a preferred embodiment of the system, it is noted that an additional preferred embodiment would be the implementation of this device in a software form for use in software applications, such as a microprogrammed computer. Such a software implementation is demonstrated by the following source program which may be run on a Data General Nova computer to accomplish the implementation of this device in software.

```
                                    WORD. 40

1/5/79

;
; ===   ===============================================================
;
;
;
;
;
;       ROUTINES TO HANDLE A/D, DO WORD BOUNDARY,
;
;       CODE AND COMPRESSION AND BUFFERING
;
;
          .TITL    WORD

.NREL

.ENT     DECD

.ENT     SETUP, WORD, NEXT, CMPR2

.EXTN    WBON, WBOFF, FRONT, ACRST

.EXTD    CUAD, CDEN, URAS, UBAD, ICH

.EXTD    MUSE, BFSUS, BFAUS, NMCH, NSAM

.EXTD    MODE, TFLG, CTHL

.EXTD    AUFWA, GRFWA, CWFWA, SBLSA, IXSAM, CNSAM

.EXTD    ACTRF

.EXTD    ETHL, T1, T2, MINSM, MXSAM
```

```
       .EXTD    SECC,TIMS,MINC,TIMM
;
;
; ==   ================================================
;
;         SETUP:   1.       SET FLAG = 1
;                  2.       FOR EACH USER:
;                  2.1          SET UP BUFFERS
;                  2.2          SET OUTIT=0
;                  2.3          SET NSAM=0, NNCH=0
;                  5.       RETURN
; ==   ================================================
;
;         WORD:    1. IF FLAG.EQ.0 THEN RETURN
;                     ELSE:
;                  2.       SET FLAG TO 0
;                  3.       CALL FRONT TO GET DATA FROM ALL CHANNELS
;                  4.       FOR EACH ACTIVE CHANNEL
;                  3.2          COMPUTE ABS SUM OF DIFFS
;                  3.3          IF ABSUM.LT.CTHL THEN:
;                                   NNCH=NNCH+1
;                                   IF(NNCH.GT.ETHL) THEN:
;                                       COMPRESS AND CODE   (CANDC)
;                                       RESET POINTERS
;                                       NEXT CHANNEL
;                                   ELSE:  NEXT CHANNEL
;                               ELSE:
;                                   TURN ON WORD BOUNDARY LIGHT
;                                   NSAM=NSAM+1
;                                   IF(NSAM.GT.MAXSAM) THEN:
;                                       COMPRESS AND CODE   (CANDC)
;                                       RESET POINTERS
;                                       NEXT CHANNEL
;                                   ELSE:
;                  3.32             SET POINTER FOR NEXT DATA
;                  3.33             GO TO NEXT CHANNEL
```

```
;            4.     SET FLAG TO 1
;                   RETURN
; == ======================================================
;
;     NEXT:  IF CDAD LT.EQ. 0 RETURN 1 WITH AC2=0
;            ELSE:
;                   AC2=CDAD
;                   CDAD=(CDAD-1)
;                   RETURN
; == ======================================================
;
;     CANDC: TURN OFF VIB. BOUNDARY LIGHT
;            IF(NSAM.LT.MINSM) THEN:
;                   RETURN
;            ELSE:
;                   CALL CMPRS
;                   GET BUFFER FOR CODED DATA
;                   UPDATE POINTERS
;                   CALL CODE
;                   RETURN
; == ======================================================
;
;
;     CMPRS  DOES COMPRESSION IN PLACE
;     1. INITIALIZE
;     1.1    GET BSIZE=NSAMP/8
;     1.2    IF BSIZE.EQ.1 RETURN
;     1.3    SET UP POINTERS
;     2. FOR 8 COMPRESSED SPECTRA
;     2.1    FOR BSIZE RAW DATA SPECTRA
;     2.11          SET START OF COMPRESSED SPECTRA
;     2.12          FOR 16 FILTERS
;     2.121                ADD RAW TO COMP DATA
;     2.122                INCREMENT POINTERS
```

```
;          2.13               NEXT FILTER
;          2.2      NEXT RAW DATA SPECTRUM
;          2.3      SET ADDRESS FOR NEXT COMPRESSED SPECTRA
;          2.4      CLEAR IT
;          2.5 NEXT COMPRESSED SPECTRA
;          3.       RETURN
;========================================================
;
;          CODE     DOES CODING FROM ADDRESS IN AC2 TO ADDRESS IN AC1
;          1.       INITIALIZE ADDRESSES
;          2.       FOR 8 CODED BLOCKS (J)
;          2.1              INITIALIZE AC0 FOR CODED DATA
;          2.2              FOR I=1,15    (BY BIT IN AC0)
;          2.21                     IF(COMP(I).GT.COMP(I+1) SET BIT IN AC0,
;                                   ELSE CLEAR IT
;          2.3              NEXT I
;          2.4              STORE AC0 IN CODED DATA BLOCK
;          3.       NEXT BLOCK
;          4. RETURN
;                   END
;========================================================
SETUP:   STA    3,SRT
         LDA    3,NUSE           ;NO. OF USERS
         STA    3,ICH
;
SETUP:   LDA    3,ICH
         LDA    1,C17
         LDA    0,BFBUS,3        ;BUFFER START ADDR. FOR THE USER
         ADD    1,0              ;+15 (+16 0'S FOR INIT -1 BEC. OF AUTO-INCR.)
         STA    0,BFAUS,3        ;STORE IN AUTO-INCR. AREA
;
         LDA    2,UBAU,3         ;USER BASE ADDR. IN AC2
         STA    0,AUBUA,2        ;SET FWA OF AUTO-INCR.
;
```

```
        SUBO    0, 0
        STA     0, NNCH, 2      ; 4. NNCH = 0
        STA     0, NSAM, 2      ;    NSAM = 0
        STA     0, IXSAM, 2     ; RESET INDEX SAMPLE#
        STA     0, TFLG, 2      ; TFLG=0
        LDA     0, THR1         ; GET THE THRESHOLD 1
        STA     0, T1, 2
        STA     0, CTHL, 2
        LDA     0, THR2         ; GET THE 2ND THRESHOLD
        STA     0, T2, 2
        LDA     0, ETHR         ; GET THE END OF THRESHOLD
        STA     0, ETHL, 2
;
        LDA     0, MINS         ; GET THE MIN. SAMPLESE
        STA     0, MINSM, 2
        LDA     0, NXSM
        STA     0, NXSAM, 2     ; SET UP MAX. # OF SAMPLES
        ADC     0, 0
        STA     0, CDAD, 2      ; INIT. THE QUEUE
        STA     0, CDEN, 2
;
        LDA     1, ICH
        JSR     @IMBOFF
;
        DSZ     ICH
        JMP     SETLP
;
        JSR     @AACRST
        JMP     @SRT            ;========= NO REAL TIME CLOCK =========
;
AACRST: ACRST
SRT:    .BLK    1
THR1:   32.
THR2:   16.
ETHR:   32.
```

```
MINS:    16.
MXSM:    200.
C17:     17
IWBON:   WBON
;
WORD:    STA      3,WRT        ;SAVE RETURN ADDRESS
         LDA      2,NUSE
         STA      2,JCH        ; 2.1 FOR EACH ACTIVE CHANNEL
;
DO1:     LDA      2,JCH        ;GET THE CURRENT USER #
         LDA      3,UBAD,2     ;GET THE USER BASE ADDRESS
         STA      3,UTEM
         JSR      @LFRON       ;CALL FRONT ROUTINE

JSR      DECD         ;GO TO DECISION ROUTINE
         JMP      INON
         LDA      3,UTEM
         LDA      1,NSAM,3     ;GET THE # OF SAMPLES
         LDA      2,MXSAM,3    ;MAX. SAMPLE#
         SUBOL#   2,1,SNC
         JMP      DNTP.        ;DON'T PROCESS
;
         LDA      2,CWRWA,3    ;GET THE CURR. WORD START
         ADD      1,2
         LDA      1,SBLSA,3    ;GET THE LAST ADDRESS OF BUFF.
         SUBZL#   1,2,SZC      ;WAS FULL ?
         JMP      NDELM        ;NOT YET
         LDA      2,SBFWA,3
         LDA      1,IXSAM,3
         ADD      1,2
         ISZ      IXSAM,3      ;INCR. INDEX SAMPLE#
;
NDELM:   STA      0,0,2        ;STORE CODED DATA
         LDA      1,T2,3
```

```
            STA     1,CTHL,3
            LDA     1,ICH
            JSR     @IWBON          ;TURN ON WB LIGHT
;
DNTP:       LDA     3,UTEM          ;USER BASE ADDR.
            ISZ     NSAM,3
            SUBO    0,0
            STA     0,NNCH,3        ;CLEAR NNCH
            JMP     RTN             ;LESS NEXT CHANNEL
INCN:       LDA     3,UTEM          ;USER BASE ADDR.
            ISZ     NNCH,3          ;INCREMENT NNCH
            LDA     0,NNCH,3
            LDA     1,ETHL,3
            SUBL    1,0,SZC         ;COMPARE NNCH : ETHL
            JMP     RTN             ;NOT YET
;
            LDA     0,T1,3
            STA     0,CTHL,3        ;SET THRESHOLD
            LDA     0,NSAM,3
            LDA     1,NINSM,3
            SUBZL#  0,1,SNC         ;WAS NSAM>NINSM ?
            JMP     INACT           ;NO. IGNORE
;
            LDA     1,MXSAM,3
            SUBZL#  0,1,SZC         ;WAS NSAM> MAX. SAMPLES ?
            JMP     INACT           ;YES DON'T PROCESS
;
            JSR     CANDC           ;COMPRESS THE RAW DATA
INACT:      LDA     1,ICH
            JSR     @IWBOFF         ;OFF. WORD BOUNDARY LIGHT
            LDA     3,UTEM          ;GET THE USER BASE ADDR.
            SUBO    0,0
            STA     0,NSAM,3        ;RESET # OF SAMPLES
            STA     0,IXSAM,3       ;RESET INDEX SAMPLE#
            STA     0,NNCH,3        ;RESET EVERYTHING FOR NEXT TIME
```

```
RTN:    LDA     2, ICH
        LDA     1, AUFWA, 3     ;GET THE AUTO-INCR. ADDR
        STA     1, BFAUG, 2
;
END1:   DSZ     ICH             ; 3. GO TO NEXT CHANNEL
        JMP     DO1
        JMP     @VRT            ; 5. RETURN
;
IVROFF: VBOFF
VRT:    .BLK    1
IFRON:  FRONT
OFR:    .BLK    1

NF:     .BLK    1
D16:    16.

;**********************************************************
;       WORD BOUNDARY DECISION ROUTINE
;
;       CALL:
;               JSR     @I----
;               NO DATA RETURN
;               HAS DATA RETURN
;**********************************************************
;
DECD:   STA     3, DERN  ;SAVE RETURN ADDR.
        LDA     0, D16   ;COUNTER
        STA     0, NF
        LDA     3, UHFM
        LDA     3, AUFWA, 3
        INC     3, 3
        SUB0    0, 0
TEST:   LDA     1, -20, 3 ;GET LOW ADDR DATA
        LDA     2, 0, 3   ;GET HIGH ADDR DATA
        SUB     1, 2
```

```
        MOVL#    2,2,SZC  ;GET ABSVAL
        NEG      2,2
        ADD      2,0               ; 2.4 SUM ABS DIFFERENCES
        INC      3,3
        DSZ      NF
        JMP      TEST
        LDA      3,UTRN
        LDA      1,CTHL,3          ;GET CTHL
        SUBL#    1,0,SZC  ;COMPARE ABSUM:CTHL
        JMP      @DERN    ;RETURN

;
;===========================================================
;       CODE THE RAW DATA
;

LDA      3,AUFWA,3
        INC      3,3
        SUBZL    0,0
TST1:   LDA      1,0,3
        STA      1,-20,3  ;SWAP THE OLD TO NEW
        LDA      2,1,3    ;GET HIGH ADDRESS DATA
        MOVZL    0,0      ;SHIFT AC0 TO LEFT
        SUBZL#   2,1,SZC  ;SKIP IF AC2 GT. AC1
        INC      0,0      ;PUT A BIT
        INC      3,3      ;BUMP TO ADDRESS
        MOVL#    0,0,SNC  ;TEST TOP BIT
        JMP      TST1     ;DO MORE

;
        STA      2,-20,3  ;SWAP IT
        MOVZL    0,0
        MOVZR    0,0      ;KNOCK IT OFF SIGN BIT
        LDA      3,DERN
        JMP      1,3

;
DERN:   .BLK     1
```

```
;********************************************************
;       CODE AND COMPRESS
;********************************************************
;
CANDC:  STA     3,CART      ;SAVE RETURN ADDRESS
        JSR     @AGTBF      ;GET THE BUFFER
        0
        LDA     0,D3
        ADD     0,1         ;GET THE LINK ADDRESS
        MOV     1,2
        LDA     3,UTEM
        LDA     0,NSAM,3    ;STORE # OF SAMPLE
        STA     0,UNSAM,2
        LDA     1,CWFWA,3
        STA     1,CURWA,2   ;SET THE CURRENT WORD START ADDR.
;
;********************************************************
;       UPDATE THE BUFF. PTR FOR NEXT WORD PROCESS
;
        LDA     0,IXSAM,3
        MOV     0,0,SNR     ;WAS ROUND OVER TO BEGINNING ?
        JMP     FCN
        LDA     1,SBFWA,3   ;GET THE FWA OF BUFF.
        JMP     OKGO        ;JUMP TO PROCESS
;
FCN:    LDA     0,NSAM,3    ;GET THE # OF SAMPLES
OKGO:   ADD     0,1
        STA     1,CWFWA,3   ;UPDATE THE FWA OF BUFF. FOR NEXT WORD
        MOV     2,1         ;NOW GET THE LINK ADDR.
;
        LDA     0,CDEN,3    ;WHERE IS END OF STRING
        MOVZL#  0,0,SNC
        JMP     C2          ;HAD ALREADY
;
        STA     1,CDAD,3    ;GET THE NEW ONE
```

```
            JMP     C1
;
C2:     MOV     0,2         ;AC2=START OF END
        STA     1,SPLNK,2   ;LINK THAT TO THE NEW ONE
C1:     STA     1,CDEN,3    ;GET NEW ONE AS THE END
        MOV     1,2
        SUBO    0,0         ;CEN=0
        STA     0,INSRC,2   ;STORE INPUT SOURCE =0
        ADC     0,0
        STA     0,SPLNK,2   ;PUT LINK OF NEW ONE AS -1 AC1=FWA DATA
;
        LDA     0,SECC
        STA     0,TIMS,3
        LDA     0,MINC
        STA     0,TIMM,3
        JMP     @CART       ;RETURN
;
D3:     3.
CART:   0
UNSAN=  -1
CURVA=  -2
INSRC=  -3
SPLNK=  -4

;************************************************************
;
;       CHECK THE SPEECH BUFF. POOL
;************************************************************
;
NEXT:   STA     3,NFIO
        LDA     3,UBAG
        LDA     2,CDAD,3    ;GET POINTER
        MOVL#   2,2,SZC     ;ANY DATA
        JMP     @NEXT       ;NO ,(RETURN)
;
```

```
        LDA     0,SPLNK,2       ;WHO IS NEXT
        STA     0,CDAD,3        ;SET CDAD
        MOVL#   0,0,SZC
        STA     0,CDEN,3        ;IF NO MORE ,SET CDEN
;*********************************************************
;       COMPRESS INTO 8 BLOCKS
;
        STA     2,SAV1  ;SAVE BUFF. ADDRESS
        MOV     2,1     ;GET FWA DATA IN AC1
        LDA     0,INSRC,2       ;CHECK THE INPUT SOURCE
        MOV     0,0,SZR ;WAS SPEECH INPUT ?
        JMP     NOS     ;NO ASCII
;
        LDA     0,UNSAM,2       ;GET THE # OF SAMPES
        STA     0,CNSAM,3       ;SAVE CURRENT WORD SAMPLE#
        LDA     2,CURWA,2       ;GET THE FWA OF RAW DATA BUFF.
        JSR     CMPR2   ;CALL COMPRESS ROUTINE
        LDA     1,SAV1  ;GET THE NEW CODED DATA BUFF. ADDR.
;
NOS:    LDA     3,NERT
        JMP     1,3     ;RETURN +1
;
SAV1:   .BLK    1
NERT:   .BLK    1
;
;*********************************************************
;
;       COMPRESSES PRE-CODED DATA
;
;       CALL:
;
;       LDA     0,NSAM          NUMBER OF SAMPLES
;       LDA     1,CDDR          CODE DATA BUFFER ADDRESS
;       LDA     2,BFAD          WORD DATA BUFFER
```

```
;       JSR     CMPR2
;       (NORMAL RETURN)
;
;===============================================
;
CMPR2:  STA     3,CNRT
        STA     1,CD
        STA     2,BD
        MOV     0,1
        MOVZR   0,0
        MOVZR   0,0
        MOVZR   0,0     ; NSAM/8
        STA     0,BSIZE ;SAVE BSIZE BASE
        ADDZL   0,0
        MOVZL   0,0     ;BSIZE BASE * 8
        SUB     0,1     ;REMAINDER
        LDA     2,BUFT  ;BUFFER ADDRESS
        ADD     1,2
        LDA     1,0,2
        STA     1,VEC1  ;DISTRIBUTION VECTOR
        LDA     0,D0
        STA     0,NBLK
;
;===============================================
;       CLEAR BIT STORAGE
;
CM1:    LDA     2,CBAD  ;GET THE BIT STORE ADDRESS
        LDA     1,D17
        SUBO    0,0
        NEG     1,1     ;NEG COUNTER
CL:     STA     0,0,2   ;CLEAR
        INC     2,2
        INC     1,1,SZR ;WAS DONE ?
        JMP     CL
```

```
            LDA     2,BD
            LDA     1,VECT     ;GET DISTRIBUTION VECTOR
            MOVZR   1,1        ;BIT 15 IN CARRY
            STA     1,VECT     ;SAVE ROTATED VECTOR
            SUBCL   1,1
            LDA     0,BSIZE    ;GET BSIZE BASE
            ADD     1,0        ;INCR. SIZE
            MOVZR   0,1
            STA     1,BTHL     ;STORE DYNAMIC BIT THRESHOLD
            STA     0,SIZE     ;STORE DYNAMIC SIZE
;
CM2:        LDA     0,0,2      ;GET CODED SLICE
            INC#    0,0,SZR    ;WAS DELIMETER ?
            JMP     NOEND      ;NO END OF BUFF.
;
            LDA     3,UBAS
            LDA     2,SBFWA,3  ;GET THE FWA OF BUFF.
            LDA     0,0,2      ;GET THE 1ST DATA
NOEND:      INC     2,2
;
;================================ FOR 16 BITS PER CODED SLICE
;
            LDA     1,C16
            STA     1,NBT
;
CM3:        MOVL    0,0,SNC    ;WAS THE BIT SET
            JMP     CM4
            LDA     3,NBT
            LDA     1,CBAD     ;YES - BUMP THAT BIT COUNT
            ADD     1,3
            ISZ     0,3
CM4:        DSZ     NBT
            JMP     CM3        ;KEEP GOING FOR MORE BITS
;
```

```
        DSZ     SIZE
        JMP     CM2                 ;KEEP GOING FOR NEXT SLICE
        STA     2,BD
;
;======== NOW USE COUNT BUFFER TO SET BITS
;
        SUB0    0,0                 ;WILL HOLD CODED DATA
;
;============================== FOR 16 BITS PER FRAME
;
        LDA     1,C16
        STA     1,NBT
CM5:    LDA     1,CBAD
        LDA     3,NBT
        ADD     1,3
        LDA     2,0,3               ;GET COUNT OF # OF ONES
;
        LDA     1,BTHL              ;ARE MORE THAN HALF ON
        SUBZL#  2,1,SZC             ;SKIP IF # < BTHL
        INC     0,0                 ;SET BIT ON
        MOVL    0,0                 ;GET SET FOR NEXT BIT
        DSZ     NBT                 ;MORE BITS
        JMP     CM5                 ;YES
;
        MOVR    0,0                 ;MOVE BACK TO 1
        LDA     2,CD
        STA     0,0,2               ;STORE CODED DATA
        INC     2,2
        STA     2,CD
;
        DSZ     NBLK                ;MORE BLOCKS
        JMP     CM1                 ;YES
        JMP     @CMRT               ;RETURN
;
```

```
;
CMKT:   .BLK    1
NBT:    .BLK    1
BSIZE:  .BLK    1
SIZE:   .BLK    1
NBLK:   .BLK    1
D4:     4.
C16:    16.
D17:    17.
BD:     .BLK    1
OD:     .BLK    1
BTBL:   .BLK    1
VCT:    .BLK    1
GRAD:   CBUF
CBUF:   .BLK    17.
BUFT:   BUF
BUF:    0
        1
        3
        7
        17
        37
        77
        177
;
        .END
```

I claim:

1. Apparatus for identifying signal patterns by comparing plural data elements identifying such patterns with plural data elements identifying a stored reference pattern, comprising:

a first buffer storing said plural data elements identifying signal patterns;

a second buffer storing said plural data elements identifying a reference pattern;

a first register for storing locations in said first buffer at which said plural data elements identifying signal patterns begin;

a second register for storing locations in said first buffer at which said plural data elements identifying signal patterns end;

first addressing means for writing plural data elements identifying said signal pattens into said first buffer, in sequential order, as said plural data elements are received;

means for determining whether said first buffer contains the plural data elements for a complete signal pattern;

second addressing means responsive to said determining means for reading plural data elements identifying said signal patterns from said first buffer at a time when the plural data elements for a complete signal pattern are stored in said first buffer, said second addressing means operating in response to the locations stored in said first and second registers, said reading performed on a time shared basis time independently from said writing operation performed by said first addressing means such that the new writing operations do not have to be delayed until previously written data is read and compared with said reference patterns; and means for comparing said plural data elements read by said second addressing means with data elements stored in said second buffer.

2. Apparatus for identifying signal patterns as defined in claim 1 wherein said second addressing means further comprises:

second means for comparing the address of said first buffer at which a data element is being read with said second register; and means responsive to said second comparing means for addressing the data elements of a new signal pattern in said first buffer.

3. Apparatus for identifying signal patterns as defined in claim 1, additionally comprising:

means for returning said first addressing means to the first location in said first buffer when said first addressing means reaches the last location in said first buffer.

* * * * *